United States Patent
Hida et al.

(10) Patent No.: US 10,131,293 B2
(45) Date of Patent: Nov. 20, 2018

(54) AUTOMOBILE POWER SUPPLY DEVICE

(71) Applicants: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

(72) Inventors: Yoshihiro Hida, Mie (JP); Shinya Itou, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 15/538,520

(22) PCT Filed: Dec. 3, 2015

(86) PCT No.: PCT/JP2015/084067
§ 371 (c)(1),
(2) Date: Jun. 21, 2017

(87) PCT Pub. No.: WO2016/104101
PCT Pub. Date: Jun. 30, 2016

(65) Prior Publication Data
US 2017/0355327 A1    Dec. 14, 2017

(30) Foreign Application Priority Data

Dec. 24, 2014 (JP) .................................. 2014-260966
Feb. 19, 2015 (JP) .................................. 2015-030682

(51) Int. Cl.
*B60R 16/02* (2006.01)
*H02J 7/14* (2006.01)
(Continued)

(52) U.S. Cl.
CPC ........... *B60R 16/0207* (2013.01); *H01B 7/20* (2013.01); *H01B 7/42* (2013.01); *H02J 7/1423* (2013.01)

(58) Field of Classification Search
None
See application file for complete search history.

(56) References Cited

U.S. PATENT DOCUMENTS 3,023,692 A * 3/1962 Crown ................. H02G 3/0456
100/1
3,363,050 A * 1/1968 Martin .................... H02G 3/045
138/155
(Continued)

FOREIGN PATENT DOCUMENTS

JP    S6467444 A    3/1989
JP    H0225343 U    2/1990
(Continued)

OTHER PUBLICATIONS

Search Report for International Appliction No. PCT/JP2015/084067, dated Feb. 9, 2016, 4 pp.

*Primary Examiner* — Chau N Nguyen
*Assistant Examiner* — Muhammed Azam
(74) *Attorney, Agent, or Firm* — Honigman Miller Schwartz and Cohn LLP (57) ABSTRACT

An automobile power supply device includes plate-shaped metal wirings and is configured to supply electric power from a battery that is installed in an engine room of a vehicle body to a vehicle interior. The metal wiring may extend in a central portion of a floor surface in the vehicle interior, and the automobile power supply device may include wire harnesses that respectively connect multiple electric devices that are installed in the vehicle body to the metal wiring in (Continued)

the vehicle interior. The metal wiring may be formed by coupling a plurality of wiring materials.

12 Claims, 8 Drawing Sheets

(51) Int. Cl.
  *H01B 7/20* (2006.01)
  *H01B 7/42* (2006.01)

(56) References Cited

U.S. PATENT DOCUMENTS

| | | | | |
|---|---|---|---|---|
| 3,656,879 A * | 4/1972 | De Vries, Jr. | B21D 17/00 | 239/554 |
| 3,700,786 A * | 10/1972 | Lawrenson | H01B 7/0045 | 156/51 |
| 3,711,632 A * | 1/1973 | Ghirardi | H02G 3/06 | 174/135 |
| 3,711,633 A * | 1/1973 | Ghirardi | H02G 3/06 | 174/135 |
| 3,733,428 A * | 5/1973 | Fry | H01B 7/0846 | 156/178 |
| 3,740,614 A * | 6/1973 | Baso | H05K 7/02 | 174/72 A |
| 3,761,603 A * | 9/1973 | Hays | H02G 3/0437 | 138/157 |
| 3,890,459 A * | 6/1975 | Caveney | H02G 3/045 | 174/101 |
| 4,093,761 A * | 6/1978 | Taylor | B21C 23/06 | 174/72 A |
| 4,136,257 A * | 1/1979 | Taylor | H02G 3/045 | 174/68.3 |
| 4,159,441 A * | 6/1979 | Livingston | H01T 13/05 | 123/169 PH |
| 4,163,572 A * | 8/1979 | Benscoter | H02G 3/0456 | 138/89 |
| 4,232,845 A * | 11/1980 | Turner | F16L 3/26 | 174/101 |
| 4,629,826 A * | 12/1986 | Thomas | H02G 3/0431 | 138/108 |
| 4,942,271 A * | 7/1990 | Corsi | H02G 3/0418 | 138/162 |
| 4,945,982 A * | 8/1990 | Das | F24F 1/06 | 165/125 |
| 4,951,716 A * | 8/1990 | Tsunoda | H02G 3/0418 | 138/157 |
| 4,952,163 A * | 8/1990 | Dola | H02G 3/0431 | 174/505 |
| 5,141,258 A * | 8/1992 | Stine | F16L 27/12 | 285/148.22 |
| 5,235,136 A * | 8/1993 | Santucci | H02G 3/266 | 174/101 |
| 5,301,907 A * | 4/1994 | Julian | F16L 3/08 | 174/135 |
| 5,332,866 A * | 7/1994 | Sawamura | H02G 3/0608 | 138/166 |
| 5,534,665 A * | 7/1996 | Long | B60R 16/0215 | 174/68.1 |
| 5,597,980 A * | 1/1997 | Weber | H02G 3/0418 | 123/143 C |
| 5,668,415 A * | 9/1997 | Nagami | B60R 16/0207 | 174/72 A |
| 5,942,724 A * | 8/1999 | Russo | H02G 3/0431 | 174/481 |
| 6,118,075 A * | 9/2000 | Baker | H04Q 1/06 | 174/100 |
| 6,229,091 B1 * | 5/2001 | Ogawa | B60R 16/0215 | 174/72 A |
| 6,300,561 B1 * | 10/2001 | Saito | B60R 16/0207 | 174/507 |
| 6,358,073 B1 * | 3/2002 | Jhanson | B60R 16/0207 | 439/164 |
| 6,380,484 B1 * | 4/2002 | Theis | F16L 3/26 | 174/101 |
| 6,444,903 B2 * | 9/2002 | Saeki | H02G 3/0437 | 174/135 |
| 6,444,912 B1 * | 9/2002 | Grossman | B60R 16/0215 | 174/135 |
| 6,528,899 B1 * | 3/2003 | Saito | H02J 1/14 | 307/10.1 |
| 6,610,929 B1 * | 8/2003 | Motokawa | B60R 16/0207 | 174/135 |
| 6,677,526 B2 * | 1/2004 | Kishizawa | H02G 3/0481 | 174/68.1 |
| 6,881,902 B2 * | 4/2005 | Aoki | B60R 16/0215 | 174/135 |
| 7,005,581 B2 * | 2/2006 | Burnette | H02G 3/0683 | 174/68.3 |
| 7,188,415 B2 * | 3/2007 | Robinson | G02B 6/4471 | 174/154 |
| 7,220,129 B1 * | 5/2007 | Nishijima | B60R 16/0215 | 174/72 A |
| 7,241,146 B1 * | 7/2007 | Kim | B60R 16/0207 | 439/34 |
| 7,307,217 B2 * | 12/2007 | Daito | B60R 16/0215 | 138/157 |
| 7,383,634 B2 * | 6/2008 | Haataja | G02B 6/4459 | 248/68.1 |
| 7,442,884 B2 * | 10/2008 | Ball | H02G 15/013 | 16/2.1 |
| 7,491,904 B2 * | 2/2009 | Villi | H02G 3/0431 | 174/101 |
| 7,751,206 B2 * | 7/2010 | Kosacek | H02G 3/30 | 174/72 A |
| 8,183,460 B2 * | 5/2012 | Williams | H02G 3/0431 | 174/481 |
| 8,729,409 B2 * | 5/2014 | Takeuchi | H02G 3/0608 | 174/50 |
| 8,785,779 B1 * | 7/2014 | Jones | H02G 3/34 | 174/480 |
| 9,579,956 B2 * | 2/2017 | Sudou | B60J 1/1853 | |
| 9,711,875 B2 * | 7/2017 | Ooba | H01R 11/12 | |
| 9,951,531 B2 * | 4/2018 | Coon | E04F 17/08 | |
| 2003/0070830 A1 * | 4/2003 | Kondo | B60R 16/0207 | 174/68.1 |
| 2003/0075980 A1 * | 4/2003 | Yoshida | B60R 16/0315 | 307/9.1 |
| 2003/0183411 A1 * | 10/2003 | Frantz | B60R 16/0207 | 174/72 A |
| 2003/0197991 A1 * | 10/2003 | Kahlon | H02J 1/08 | 361/90 |
| 2004/0164703 A1 * | 8/2004 | Berels | B60L 11/14 | 320/103 |
| 2004/0251858 A1 * | 12/2004 | Asao | B60K 1/04 | 318/139 |
| 2005/0099036 A1 * | 5/2005 | Seifert | B60J 7/02 | 296/216.08 |
| 2007/0252169 A1 * | 11/2007 | Tokuyama | H02M 7/003 | 257/162 |
| 2010/0038011 A1 * | 2/2010 | Yoshinaga | B60R 16/0207 | 156/85 |
| 2010/0039070 A1 * | 2/2010 | Hargett | B60L 11/1809 | 320/137 |
| 2010/0133025 A1 * | 6/2010 | Flett | B60K 6/46 | 180/65.22 |
| 2011/0214903 A1 * | 9/2011 | Sawada | H05K 1/0366 | 174/251 |
| 2012/0305308 A1 * | 12/2012 | Toyama | B60R 16/0207 | 174/70 R |
| 2013/0187590 A1 * | 7/2013 | Ferrel | H02J 7/1423 | 320/104 |

(56) References Cited

U.S. PATENT DOCUMENTS

| | | | | |
|---|---|---|---|---|
| 2014/0207318 | A1* | 7/2014 | Sisk | B60L 1/00 |
| | | | | 701/22 |
| 2015/0349471 | A1* | 12/2015 | Maki | H01R 13/6691 |
| | | | | 307/10.1 |
| 2016/0031341 | A1* | 2/2016 | Komatsu | B60L 11/126 |
| | | | | 307/10.1 |

FOREIGN PATENT DOCUMENTS

| | | |
|---|---|---|
| JP | 3041397 B2 | 5/2000 |
| JP | 2010120565 A | 6/2010 |
| JP | 2011165354 A | 8/2011 |
| JP | 2011245898 A | 12/2011 |
| JP | 2014060856 A | 4/2014 |

* cited by examiner

PRIOR ART

AUTOMOBILE POWER SUPPLY DEVICE

CROSS-REFERENCE TO RELATED APPLICATIONS

This application is the U.S. national stage of PCT/JP2015/084067 filed Dec. 3, 2015, which claims priority of Japanese Patent Application No. JP 2014-2690966 filed Dec. 24, 2014 and Japanese Patent Application No. JP 2015-030682 filed Feb. 19, 2015.

TECHNICAL FIELD

The present invention relates to a power supply device for supplying electric power from a battery in an automobile to multiple electric loads.

BACKGROUND

Figure 14:
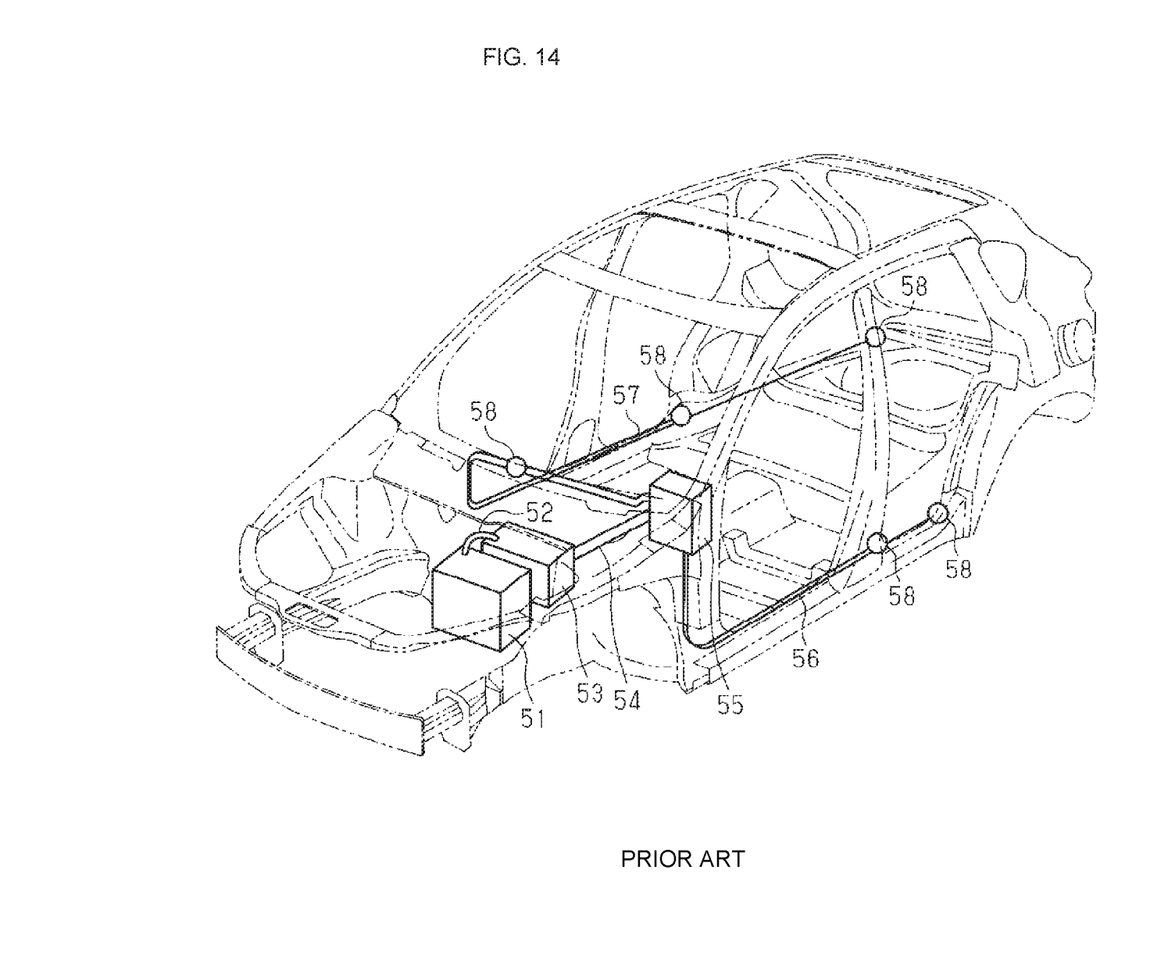
FIG. 14 is a perspective view illustrating a conventional power supply device.

FIG. 14 shows an example of a conventional power supply device. Electric power is supplied from a battery 51 that is installed in an engine room of an automobile to an electric junction box 53 via a cable 52, and is supplied from this electric junction box 53 to an electric junction box 55 that is installed in a vehicle interior via a wire harness 54. Ordinary, the wire harness 54 is a bundle of multiple power supply lines.

A plurality of wire harnesses 56 and 57 that extend from the electric junction box 55 are routed on a floor surface in the vehicle interior. The electric power is supplied, via the wire harnesses 56 and 57, to a plurality of electric devices 58 that are installed in a vehicle body.

The wire harness 54 penetrates a partition wall that separates the engine room from the vehicle interior, and is routed to the vehicle interior. A grommet that is made of rubber is fitted into the penetration portion formed in the partition wall to seal the vehicle interior against the engine room.

Furthermore, in the vehicle interior, the wire harnesses 56 and 57 are covered and protected by a protector, and are held on the floor surface by clamp members at predetermined intervals.

In recent years, due to an increase in the number of electric devices that are installed in an automobile, the number of electric wires that constitute a wire harness tends to increase, and the wire harness tends to grow in size. As a result, the partition wall between the engine room and the vehicle interior needs to be provided with a large through hole through which the wire harness passes.

Furthermore, due to the growing size of a wire harness, the space needed for routing the wire harness increases, the number of components needed for protecting and holding the wire harness increases, and the number of man-hours needed for the routing increases.

JP 3041397B discloses a connection structure in which an underbody of a vehicle body is provided with a thin circuit structure and a connector, in order to solve the problems regarding the growing size of a wire harness, and the number of man-hours needed for routing the wire harness.

However, because the number and the installation positions of electric devices vary depending on types of vehicles, the connection structure of JP 3041397B needs to prepare an underbody provided with a thin circuit structure and a connector that are specific for each type of vehicles. Accordingly, there is the problem that the automobile manufacturing cost increases.

SUMMARY

The present invention was made in view of the above-described circumstances, and it is an object thereof to provide an automobile power supply device in which a power supply wiring can easily be routed.

According to one aspect of the present invention, an automobile power supply device includes a plate-shaped metal wiring configured to supply electric power from a battery that is installed in an engine room of a vehicle body to a vehicle interior.

According to this configuration, it is possible to reduce the diameter of a through hole that is formed in a partition wall between the engine room and the vehicle interior.

Preferably, the metal wiring may extend in a central portion of a floor surface in the vehicle interior, and the automobile power supply device may further include wire harnesses that respectively connect multiple electric devices that are installed in the vehicle body to the metal wiring in the vehicle interior.

According to this configuration, electric power is supplied from one plate-shaped metal wiring, which is a basic power supply line, to the loads via the wire harnesses, making it possible to reduce the size of the wire harnesses.

Preferably, the metal wiring may be formed by coupling a plurality of wiring materials.

According to this configuration, the metal wiring is formed by coupling short wiring materials to each other.

Preferably, the plurality of wiring materials may be identical wiring materials, and both ends of each wiring material may be provided with coupling means.

According to this configuration, metal wirings having different lengths are formed by coupling identical wiring materials to each other via coupling means.

Preferably, the automobile power supply device may further include a connection device that is provided on the metal wiring, and is capable of connecting to a wire harness that corresponds to each of the electric devices at a position that is closest to the electric device.

According to this configuration, the lengths of the wire harnesses that connect the metal wiring and the respective electric devices are reduced.

Preferably, the metal wiring may include a pair of a positive metal wiring and a negative metal wiring that extends alongside the positive metal wiring.

According to this configuration, the automobile power supply device can be applied to a vehicle body that is made of an electrically non-conductive insulating material such as a carbon body, and furthermore, it is possible to reduce the lengths of the wire harnesses that connect the metal wiring and the respective electric devices.

Preferably, the automobile power supply device may further include a base that is electrically insulating, and holds the metal wiring on the vehicle body.

According to this configuration, the metal wiring is electrically insulated from the vehicle body by the base.

Preferably, the base may be provided with holding portions that hold the positive metal wiring and the negative metal wiring side by side. According to this configuration, the positive metal wiring and the negative metal wiring are held side by side while being electrically insulated from the vehicle body.

According to the automobile power supply device of the present invention, a power supply wiring can easily be routed. Other aspects and advantages of the present invention will be apparent based on the description below with

DETAILED DESCRIPTION OF PREFERRED EMBODIMENTS

First Embodiment

Figure 1:
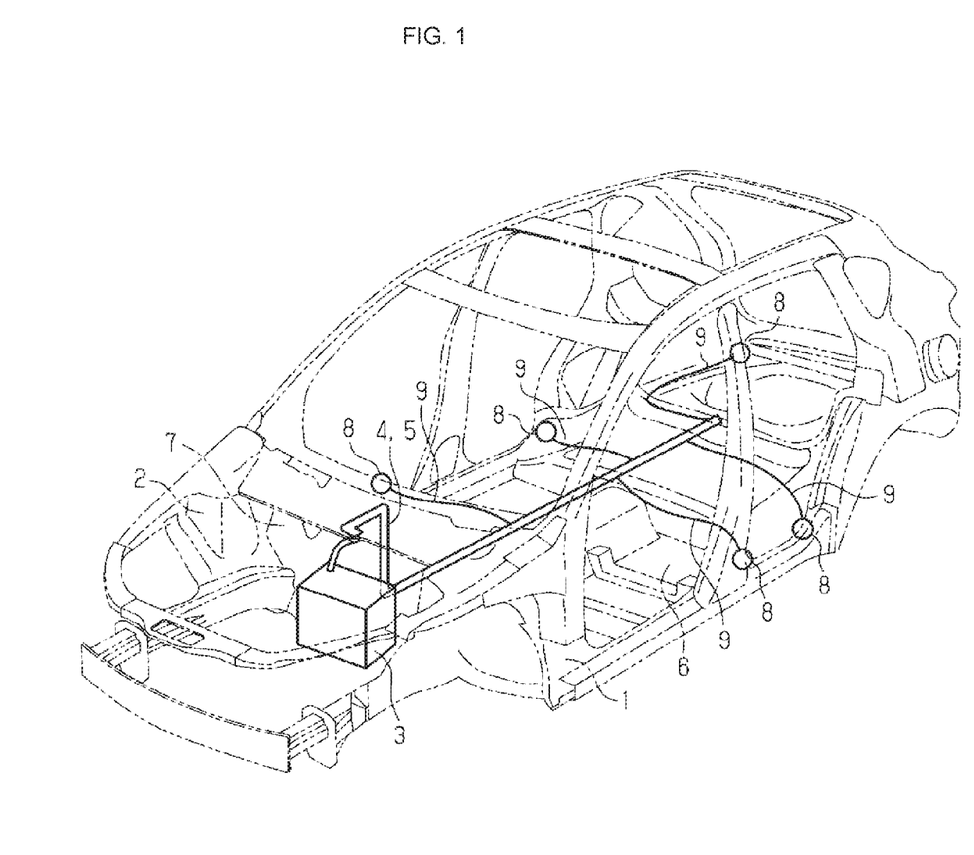
FIG. 1 is a perspective view illustrating an automobile power supply device according to a first embodiment.

Hereinafter, a first embodiment of an automobile power supply device will be described with reference to the drawings. As shown in FIG. 1, a battery 3 is installed in an engine room 2 of a vehicle body 1 of an automobile, and plate-shaped metal wirings 4 and 5 are respectively attached to a positive terminal and a negative terminal of the battery 3.

The metal wirings 4 and 5 penetrate a partition wall 7, which separates the engine room 2 from a vehicle interior 6, while ensuring insulation from the vehicle body 1, and extend into the vehicle interior 6. Then, the metal wirings 4 and 5 extend downward along the partition wall 7 in the vehicle interior 6, and further extend rearward the vehicle body 1 in the central portion of the floor surface of the vehicle interior 6.

A plurality of electric devices 8 that are installed in the vehicle body 1 are connected, via wire harnesses 9, to the metal wirings 4 and 5 at positions that are closest to the respective electric devices 8. As shown in FIG. 1, the plate-shaped metal wirings 4 and 5 may be a pair of a positive metal wiring 4 and a negative metal wiring 5 that extends alongside the positive metal wiring 4.

The following will describe connection devices for connecting the wire harnesses 9 to the metal wirings 4 and 5.

Figure 2:
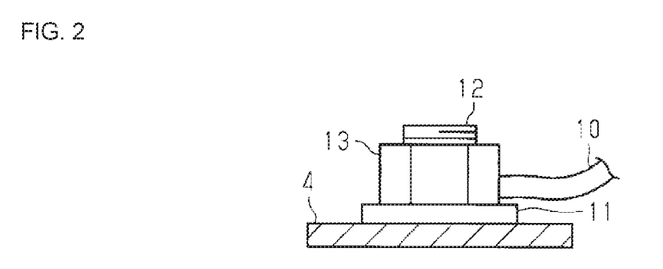
FIG. 2 is a partial cross-sectional view illustrating a connection device that connects a wire harness to a metal wiring.

As shown in FIG. 2, a circular terminal 11 is attached to an end portion of a positive power supply wiring 10 of a wire harness 9, and is fitted to a bolt 12 that is attached to the metal wiring 4. Then, by screwing a nut 13 on the bolt 12, the terminal 11 is electrically connected to the metal wiring 4. Bolts 12 are attached to the metal wiring 4 at positions that are closest to the respective electric devices 8.

The same applies to the negative metal wiring 5, and negative power supply wirings of the wire harnesses 9 are attached to the metal wiring 5. Furthermore, the negative metal wiring may be connected to the vehicle body 1 in the vicinity of the partition wall 7 to connect the negative power supply wirings of the wire harnesses 9 to the vehicle body 1.

Figure 3:
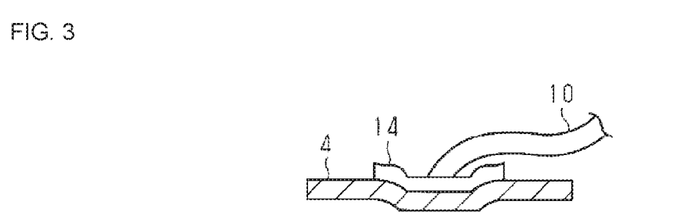
FIG. 3 is a partial cross-sectional view illustrating a first modification of the connection device.

FIG. 3 shows a first modification of the connection device. A terminal 14 is attached to an end portion of a positive power supply wiring 10 of a wire harness 9, and is crimped or welded to the metal wiring 4.

The same applies to the negative metal wiring 5, and negative power supply wirings of the wire harnesses 9 are attached to the metal wiring 5. Furthermore, the negative metal wiring may be connected to the vehicle body 1 in the vicinity of the partition wall 7 to connect the negative power supply wirings of the wire harnesses 9 to the vehicle body 1

Figure 4:
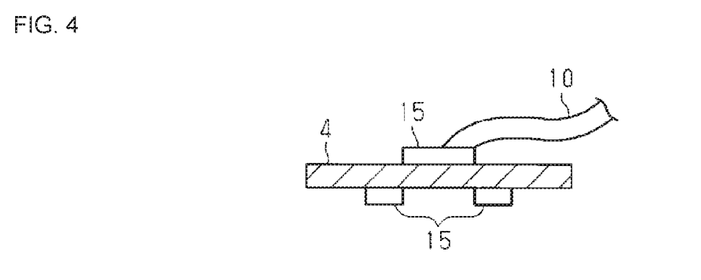
FIG. 4 is a partial cross-sectional view illustrating a second modification of the connection device.

FIG. 4 shows a second modification of the connection device. A comb-like terminal 15 is attached to an end portion of a positive power supply wiring 10 of a wire harness 9, and is fitted to the metal wiring 4, so that the terminal 15 is electrically connected to the metal wiring 4.

The same applies to the negative metal wiring 5, and negative power supply wirings of the wire harnesses 9 are attached to the metal wiring 5. Furthermore, the negative metal wiring may be connected to the vehicle body 1 in the vicinity of the partition wall 7 to connect the negative power supply wirings of the wire harnesses 9 to the vehicle body 1.

Figure 5:
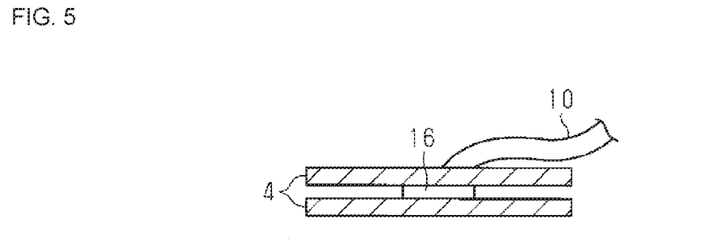
FIG. 5 is a partial cross-sectional view illustrating a third modification of the connection device.

FIG. 5 shows a third modification of the connection device. Two positive metal wirings 4 extend side by side, and a terminal 16 that is attached to an end portion of a positive power supply wiring 10 is interposed between the metal wirings 4.

The same applies to the negative metal wirings 5, and negative power supply wirings of the wire harnesses 9 are attached to the metal wirings 5. Furthermore, the negative metal wirings may be connected to the vehicle body 1 in the vicinity of the partition wall 7 to connect the negative power supply wirings of the wire harnesses 9 to the vehicle body 1.

Figure 6:
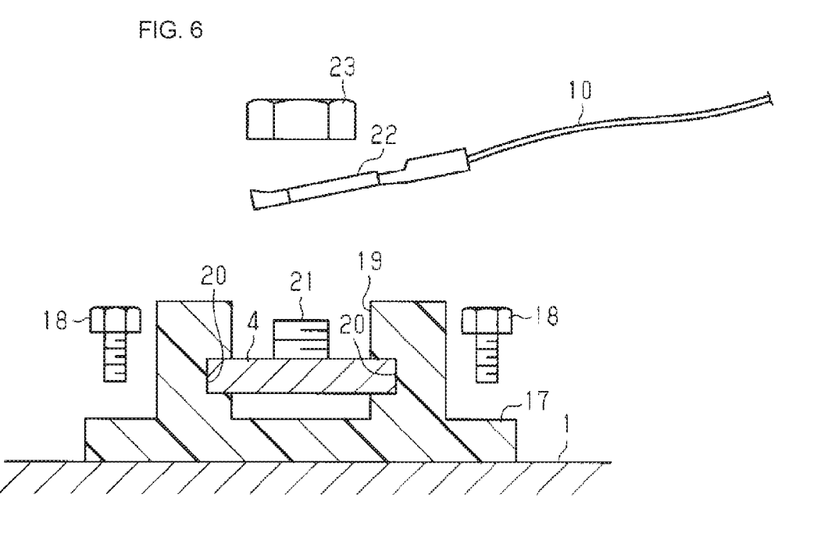
FIG. 6 is a partial cross-sectional view illustrating a fourth modification of the connection device.

FIG. 6 shows a fourth modification of the connection device. A base 17 that is made of a synthetic resin is fixed to the vehicle body 1 with screws 18. The base 17 includes, in the central portion in its width direction, a recessed ridge 19 that is open upward and is provided with, on the side surfaces of the recessed ridge 19, supporting grooves 20 that face each other.

The metal wiring 4 is inserted into and held by the supporting grooves 20, and a bolt 21 is attached to an intermediate portion, in the width direction, of the metal wiring 4. Also, a terminal 22 that is attached to a front end of a power supply wiring 10 is to be fitted to the bolt 21, and is to be fixed thereto with a nut 23.

With such a configuration, the power supply wiring 10 is electrically connected to the metal wiring 4, and the metal wiring 4 and the vehicle body 1 are electrically isolated from each other at the base 17.

The negative metal wiring 5 as well is held on a similar base, and negative power supply wirings of the wire harnesses 9 are attached to the negative metal wiring 5. Furthermore, the negative metal wiring may be connected to the vehicle body 1 in the vicinity of the partition wall 7 to connect the negative power supply wirings of the wire harnesses 9 to the vehicle body 1.

Figure 7:
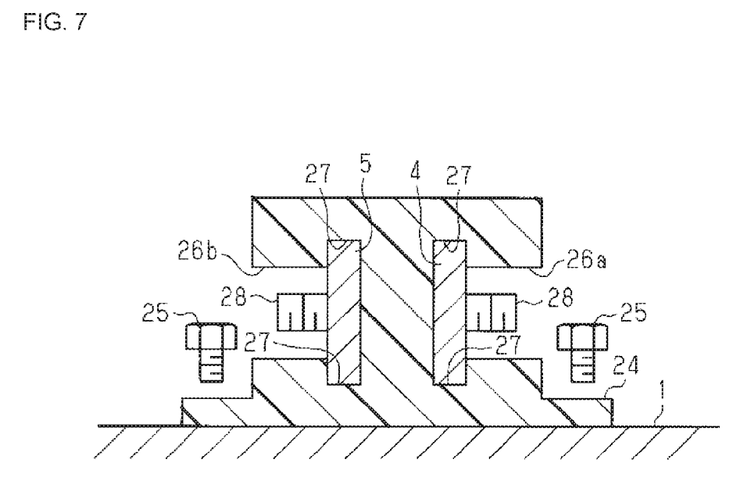
FIG. 7 is a cross-sectional view illustrating a fifth modification of the connection device.

FIG. 7 shows a fifth modification of the connection device. A base 24 that is made of a synthetic resin is fixed to the vehicle body 1 with screws 25. The base 24 includes, on the side surfaces in its width direction, recessed ridges 26a and 26b that are laterally open and are provided with, on the upper and lower edges of the recessed ridges 26a and 26b, supporting grooves 27 that face each other. In the example of FIG. 7, the supporting grooves 27 of the base 24 function as holding portions that hold the positive metal wiring 4 and the negative metal wiring 5 side by side.

The metal wirings 4 and 5 are inserted into and held by the supporting grooves 27 of the recessed ridges 26a and 26b, and multiple bolts 28 are attached in advance to predetermined positions in the intermediate portion, in the width direction, of the metal wiring 4. Then, by fitting terminals attached to front ends of the positive and negative power supply wirings to the bolts 28, and fixing them with nuts, the positive and negative power supply wirings are electrically connected to the metal wirings 4 and 5.

The following will describe effects of the automobile power supply device that has the above-described configuration.

Electric power is supplied from the battery 3 to the metal wirings 4 and 5, and is supplied into the vehicle interior 6 via the metal wirings 4 and 5. Then, the electric power is supplied to the multiple electric devices 8 arranged in the vehicle body 1 via the wire harnesses 9 that are connected to the metal wirings 4 and 5 at positions that are closest to the respective electric devices 8.

The metal wirings 4 and 5 penetrate the partition wall 7 from the engine room 2, and are guided into the vehicle interior 6. Accordingly, it is possible to reduce the size of the through hole that is formed in the partition wall, compared to a case where a wire harness penetrates the partition wall.

In the automobile power supply device as described above, the following effects can be obtained.

(1) Electric power is supplied from the engine room 2 into the vehicle interior 6 via the plate-shaped metal wirings 4 and 5, and are supplied from the positions on the metal wirings 4 and 5 that are closest to the respective electric devices 8 to the electric devices 8 via the wire harnesses 9. Accordingly, it is possible to reduce the number of power-supplying electric wires that are bundled together into a wire harness 9 that is routed in the vehicle interior 6, and thus it is possible to reduce the space that is needed for routing the wire harnesses 9.

(2) The diameter of each wire harness 9 can be reduced, and thus it is possible to easily perform a routing operation.

(3) The metal wirings 4 and 5 penetrate the partition wall 7 between the engine room 2 and the vehicle interior 6, and thus the through hole can be downsized compared to a case where a wire harness penetrates the partition wall 7, and it is possible for the metal wirings 4 and 5 to easily penetrate the partition wall 7.

(4) It is possible to reduce the diameter of and the length of the wire harnesses 9 that extend from the metal wirings 4 and 5 to the electric devices 8, and thus it is possible to reduce the number of clamp members and protectors for holding the wire harnesses 9 on the vehicle body 1. Accordingly, a reduction in the number of components is possible.

(5) There is no need of providing a thin circuit structure and a connector on the underbody of the vehicle body as disclosed in JP 3041397B. Accordingly, it is easy to use the same underbodies for different types of vehicles.

Second Embodiment

Figure 8:
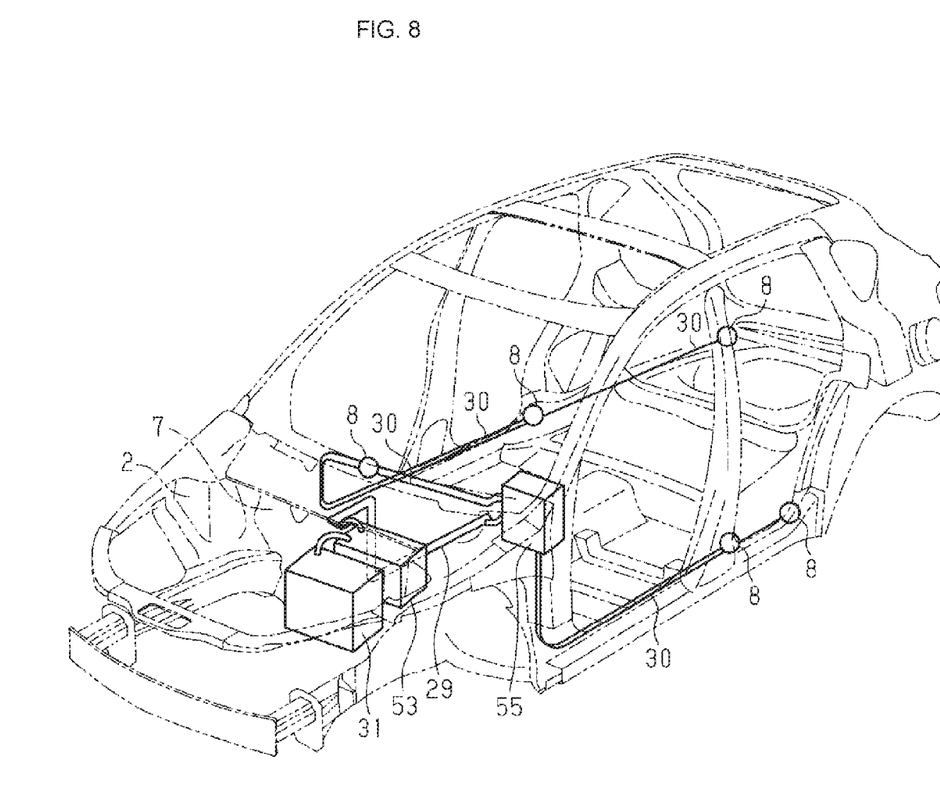
FIG. 8 is a perspective view illustrating an automobile power supply device according to a second embodiment.

A second embodiment will be described with reference to FIG. 8. In the second embodiment, a metal wiring 29 is connected only between an electric junction box 53 in the engine room 2 and an electric junction box 55 in the vehicle interior, and electric power is supplied from the electric junction box 55 to the electric devices 8 via wire harnesses 30. Other structural aspects are the same as in the first embodiment.

With such a configuration, it is possible to reduce the diameter of a through hole that is formed in the partition wall 7 and through which the metal wiring 29 is passed.

Third Embodiment

A third embodiment will be described with reference to FIGS. 9 to 13. The third embodiment has a configuration in which a metal wiring that is obtained by coupling a plurality of wiring materials extends in the vehicle interior. Other structural aspects are the same as in the first embodiment.

Figure 9:
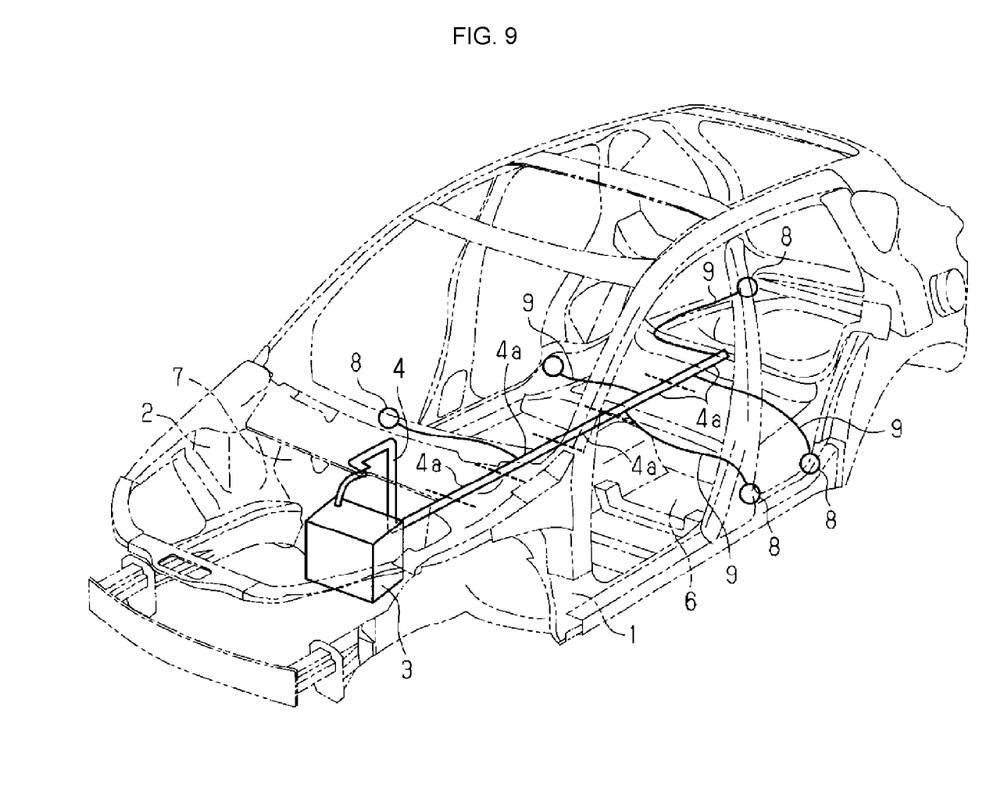
FIG. 9 is a perspective view illustrating an automobile power supply device according to a third embodiment.

As shown in FIG. 9, a metal wiring 4 that is connected to the positive terminal of the battery 3 is obtained by coupling a plurality of wiring materials 4a, and a predetermined length of the metal wiring 4 is ensured in the vehicle interior 6.

An example of the coupling structure of the wiring materials 4a will be described with reference to FIG. 10. A bolt 31 that projects in the thickness direction of the wiring material 4a is fixed to one end portion of a wiring material 4a, and a passage hole 32 into which the bolt 31 can be inserted is formed in the other end portion of the wiring material 4a. Furthermore, a nut 33 can be screwed on the bolt 31. In this example, the bolt 31, the passage hole 32, and the nut 33 serve as coupling means.

Furthermore, the other end portion of the wiring material 4a is provided with a step whose height corresponds to the plate thickness of the wiring material 4a, so that when the bolt 31 is fitted into the passage hole 32, the coupled wiring materials 4a extend evenly.

By coupling a plurality of wiring materials 4a having such a configuration, it is possible to easily configure a metal wiring 4 that has the length suitable for the vehicle interior length.

Furthermore, a metal wiring that is connected to the negative terminal of the battery 3 may also be constituted by similar wiring materials, and may extend in the vehicle interior. The negative power supply may be used as a body earth.

A first modification of the coupling structure of wiring materials 4a will be described with reference to FIG. 11. In this example, a coupling plate 35 to which two bolts 34 are fixed is fixed to a seat 36, and passage holes 37 through which the bolts 34 can be inserted are each provided in an end portion of the wiring material 4a. The coupling plate 35 is made of conductive metal, and the seat 36 is made of an insulating material.

Then, by passing the bolts 34 into the passage holes 37 formed in the end portions of the wiring materials 4a, and fixing them with nuts 38, it is possible to electrically connect the wiring materials 4a to each other via the coupling plate 35. In this example, the bolts 34, the coupling plate 35, the seat 36, the passage holes 37, and the nuts 38 serve as coupling means.

Figure 12:
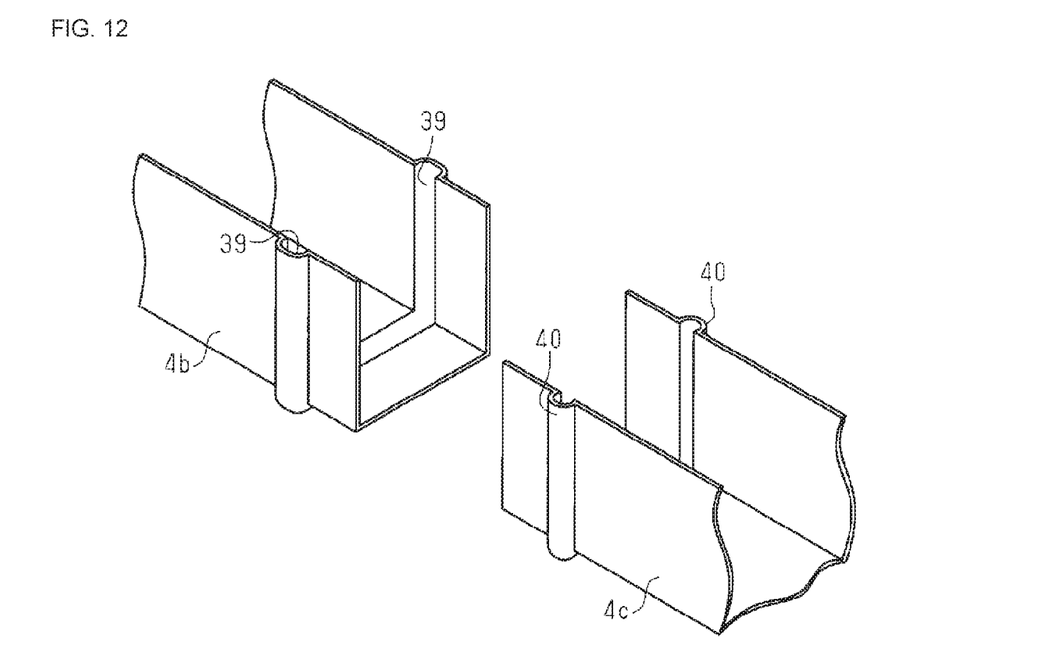
FIG. 12 is a perspective view illustrating a second modification of the coupling structure of wiring materials.

A second modification of the coupling structure of wiring materials will be described with reference to FIG. 12. In this example, wiring materials 4b and 4c that constitute the metal wiring 4 have a groove-shaped cross section, and the groove width of one wiring material 4b is larger than the groove width of the other wiring material 4c, so that the wiring material 4c can be fitted into the wiring material 4b from above.

The wiring material 4b is provided with, on its inner surface in an end portion, recessed ridges 39 that extend in a vertical direction, and the wiring material 4c is provided with, on its outer surface in an end portion, projecting ridges 40 that extend in the vertical direction. When the wiring material 4c is fitted into the wiring material 4b, the projecting ridges 40 can be fitted into the recessed ridges 39.

Accordingly, as a result of the wiring materials 4b and 4c being coupled to each other, and the recessed ridges 39 and the projecting ridges 40 coming into contact with each other, the wiring materials 4b and 4c are electrically connected to each other. In this example, the recessed ridges 39 and the projecting ridges 40 serve as the coupling means.

Figure 13:
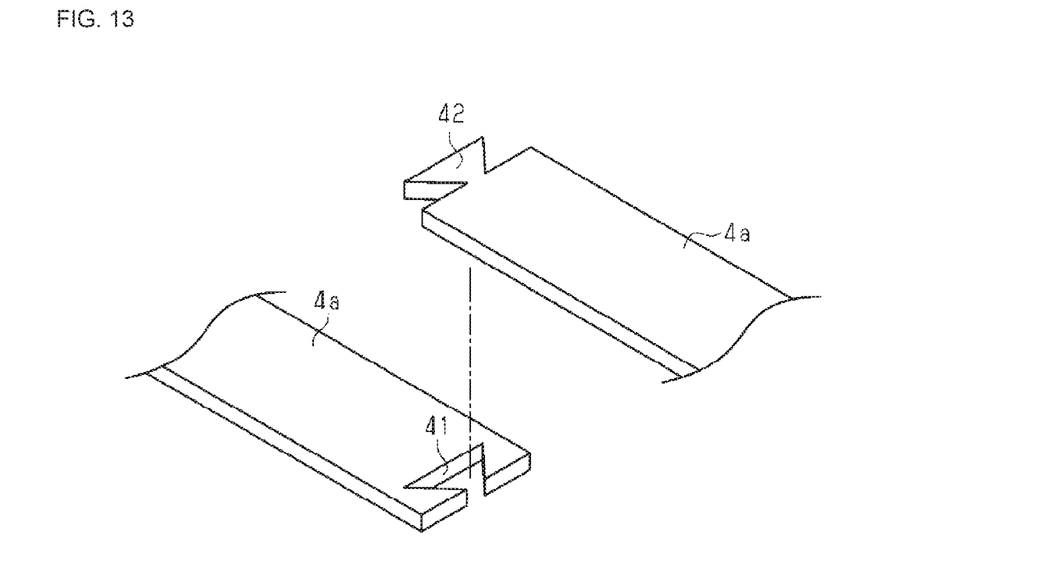
FIG. 13 is a perspective view illustrating a third modification of the coupling structure of wiring materials.

A third modification of the coupling structure of wiring materials will be described with reference to FIG. 13. In this example, the wiring material 4a is provided with, at one end portion thereof, a recessed fitting portion 41 whose width increases toward the inside, and is provided with, at the other end portion of the wiring material 4a, a projecting fitting portion 42 that can be fitted into the recessed fitting portion 41. Both the recessed fitting portion 41 and the projecting fitting portion 42 are punched by a pressing machine. Note that the projecting fitting portion 42 is slightly larger than the recessed fitting portion 41.

Then, when the projecting fitting portion 42 is pressed into the recessed fitting portion 41, the wiring materials 4a are coupled to each other, and are electrically connected to each other. In this example, the recessed fitting portion 41 and the projecting fitting portion 42 serve as the coupling means.

The automobile power supply device according to the third embodiment can achieve, in addition to the effects described in the first embodiment, the following effects.

(1) By coupling a plurality of wiring materials 4a to each other, or coupling the wiring materials 4b and 4c to each other, it is possible to form the metal wiring 4 having a predetermined length. Accordingly, because it is only necessary to transport divided short wiring materials to automobile assembly factories, a transport operation is simplified and an operation of routing metal wirings is also simplified.

(2) Since it is possible to assemble the metal wiring 4 by coupling a plurality of wiring materials 4a (4b and 4c) to each other, the length of the metal wiring 4 can easily be changed. Accordingly, the identical materials can be used to form metal wirings 4 that have different lengths.

(3) Since metal wirings 4 having different lengths can be formed, the automobile power supply device is also easily applicable to cases where metal wirings having variety of lengths for small automobiles, medium-sized automobiles, and large automobiles are needed. Therefore, metal wirings that cover multiple types of automobiles having different platforms can be made of identical wiring materials.

Note that the above-described embodiments may be modified as follows.

In the third embodiment, a plurality of types of metal wiring portions that penetrate the partition wall 7 and extend downward in the vehicle interior are made of wiring materials, and may be coupled to metal wirings that extend on an underbody. This is applicable to various types of automobiles that have different heights from the penetration position in the partition wall 7 to the underbody.

In the third embodiment, wiring materials may be appropriately coupled to metal wirings for small automobiles to form metal wirings for medium-sized automobiles or large automobiles.

The number of wiring materials 4a that are coupled to each other, and the size and shape of each wiring material 4a may be selected or determined based on the length and the shape of a path in which the metal wiring 4 is to be routed. For example, the wiring materials 4a that are coupled to each other may be linear electrical conducting materials that have the same length. Some wiring materials may have a first length, and some of the other wiring materials may have a second length that is different from the first length. Some of the wiring materials 4a that are coupled to each other may be linear, and some of other wiring materials 4a may be non-linear, for example, bent or curved. The wiring materials 4a may be selected or determined from groups of general-purpose wiring materials including wiring materials having a plurality of predetermined sizes and wiring materials having a plurality of predetermined shapes. The wiring materials 4a may be also referred to as "general-purpose wiring materials".

Figure 10:
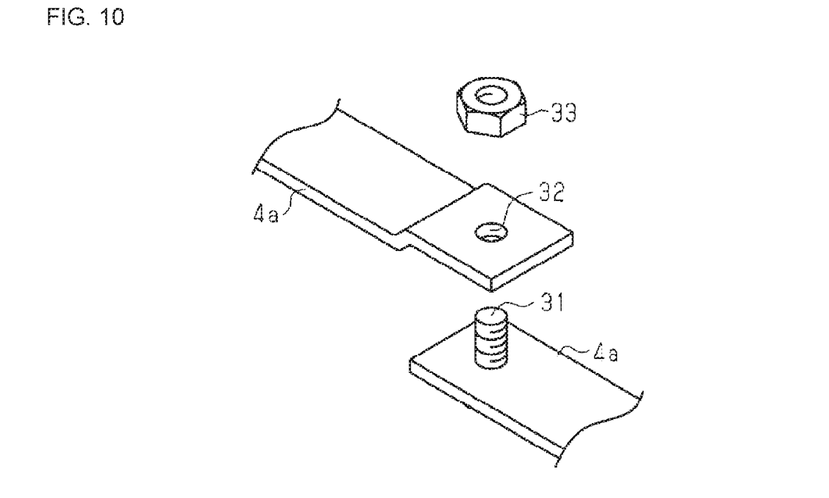
FIG. 10 is a perspective view illustrating a coupling structure of wiring materials.
Figure 11:
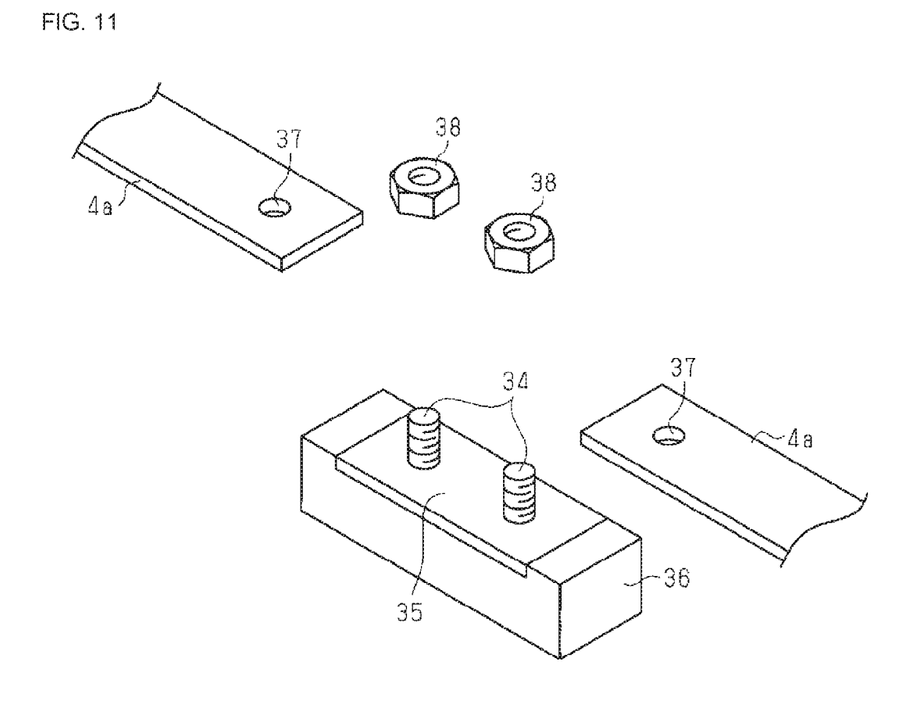
FIG. 11 is a perspective view illustrating a first modification of the coupling structure of wiring materials.

Although FIGS. 10 and 11 show the wiring materials 4a that are to be coupled linearly to each other by the coupling means, the coupling means may couple the wiring materials 4a to each other such that they are bent, for example, at a right angle.

The embodiments and the modifications may appropriately be combined with each other, and a part of the configuration of one embodiment may be replaced by a part of the configuration of another embodiment, or a part of the configuration of one embodiment may be added to another embodiment. A person skilled in the art will understand the functional effects that can be obtained by such replacement or addition, based on the disclosure of the description and the drawings of the present application.

The present invention is not limited to the shown examples. For example, the exemplified features are not to be construed as being essential for the present invention, and the subject matter of the present invention may also be present in fewer features than all the features of the disclosed specific embodiments.

The invention claimed is:

1. An automobile power supply device comprising:
a plate-shaped metal wiring configured to supply electric power from a battery that is installed in an engine room of a vehicle body to a vehicle interior, a partition wall separating the engine room from the vehicle interior, wherein the partition includes an aperture for receiving the plate-shaped metal wiring, and
a base that is electrically insulating, and holds the metal wiring on the vehicle body, the base having a recessed ridge that is open upward so as to define a pair of side surfaces that face each other, and supporting grooves disposed on each of the side surfaces, the supporting grooves configured to hold an opposite side of the plate-shaped metal wiring.

2. The automobile power supply device according to claim 1, wherein the metal wiring extends in a central portion of a floor surface in the vehicle interior, and the automobile power supply device further comprises wire harnesses that respectively connect multiple electric devices that are installed in the vehicle body to the metal wiring in the vehicle interior.

3. The automobile power supply device according to claim 2, wherein the metal wiring is formed by coupling a plurality of wiring materials.

4. The automobile power supply device according to claim 3,
wherein the plurality of wiring materials are identical wiring materials, and both ends of each wiring material are provided with coupling means.

5. The automobile power supply device according to claim 2, further composing,
a connection device that is provided on the metal wiring, and is capable of connecting to a wire harness that corresponds to each of the electric devices at a position that is closest to the electric device.

6. The automobile power supply device according to claim 2, wherein the metal wiring includes a pair of a positive current metal wiring and a negative current metal wiring that extends alongside the positive current metal wiring.

7. The automobile power supply device according to claim 5, wherein the metal wiring includes a pair of a positive current metal wiring and a negative current metal wiring that extends alongside the positive current metal wiring.

8. The automobile power supply device according to claim 1, wherein the base is provided with holding portions that hold a positive current metal wiring and a negative current metal wiring side by side.

9. The automobile power supply device according to claim 3, further comprising a connection device that is provided on the metal wiring, and is capable of connecting to a wire harness that corresponds to each of the electric devices at a position that is closest to the electric device.

10. The automobile power supply device according to claim 4, further comprising a connection device that is provided on the metal wiring, and is capable of connecting to a wire harness that corresponds to each of the electric devices at a position that is closest to the electric device.

11. The automobile power supply device according to claim 3, wherein the metal wiring includes a pair of a positive current metal wiring and a negative current metal wiring that extends alongside the positive current metal wiring.

12. The automobile power supply device according to claim 4, wherein the metal wiring includes a pair of a positive current metal wiring and a negative current metal wiring that extends alongside the positive current metal wiring.

* * * * *